United States Patent
Van Berkel et al.

(10) Patent No.: US 11,739,868 B2
(45) Date of Patent: *Aug. 29, 2023

(54) DIG TUBES AND FITTINGS FOR TUBULARS

(71) Applicant: Vac Safe Solutions Ltd., St. Albert (CA)

(72) Inventors: Clint Scott Van Berkel, St. Albert (CA); Chris Aron Wood, Kelowna (CA); Ricardo Januario, Edmonton (CA)

(73) Assignee: Vac Safe Solutions Ltd., St. Albert (CA)

( * ) Notice: Subject to any disclaimer, the term of this patent is extended or adjusted under 35 U.S.C. 154(b) by 97 days.

This patent is subject to a terminal disclaimer.

(21) Appl. No.: 17/227,181

(22) Filed: Apr. 9, 2021

(65) Prior Publication Data

US 2021/0332919 A1 Oct. 28, 2021

Related U.S. Application Data

(63) Continuation of application No. 15/435,236, filed on Feb. 16, 2017, now Pat. No. 10,995,887.

(Continued)

(30) Foreign Application Priority Data

May 30, 2016 (CA) ...................................... 2931476

(51) Int. Cl.
*F16L 21/06* (2006.01)
*E02D 17/00* (2006.01)
(Continued)

(52) U.S. Cl.
CPC .............. *F16L 21/06* (2013.01); *E02D 17/00* (2013.01); *E02F 3/90* (2013.01); *E02F 5/003* (2013.01); *F16L 9/12* (2013.01)

(58) Field of Classification Search
CPC . F16L 21/00; F16L 21/06; F16L 19/02; F16L 19/025; F16L 19/0283;
(Continued)

(56) References Cited

U.S. PATENT DOCUMENTS 5,380,803 A * 1/1995 Coutant ................. C08L 23/06
525/240
5,391,014 A 2/1995 Chen
(Continued)

FOREIGN PATENT DOCUMENTS

CA 2 903 443 C 3/2016

OTHER PUBLICATIONS

"Search Products: Dig Tubes," Ontario Hose, Ontario Canada, <http://www.ontariohose.com/?s=tubes&type=product>, at least as early as Mar. 2017, 9 pages.

(Continued)

*Primary Examiner* — Aaron M Dunwoody
(74) *Attorney, Agent, or Firm* — CHRISTENSEN O'CONNOR JOHNSON KINDNESS PLLC

(57) ABSTRACT

A female fitting includes a tube having an end that includes an upset for receiving a male fitting, the upset having an outer circumference and an inwardly extending groove extending around the outer circumference for receiving a clamp or portion of a clamp and the upset having an end face and inner surface, the upset having an undercut between the end face and inner surface for receiving a flange of the male fitting. A male fitting includes a tube having an end part; and a transition between the tube and the end part, the transition comprising a flange extending radially outward from the tube and a radiused corner connecting the flange to the end part.

16 Claims, 4 Drawing Sheets

Related U.S. Application Data

(60) Provisional application No. 62/296,066, filed on Feb. 16, 2016.

(51) Int. Cl.
*E02F 3/90* (2006.01)
*E02F 5/00* (2006.01)
*F16L 9/12* (2006.01)

(58) Field of Classification Search
CPC ....... F16L 19/0286; F16L 47/06; F16L 47/04; F16L 27/04; E02F 7/10; B01D 2221/08
USPC ................................ 210/241, 170.04, 747.4
See application file for complete search history.

(56) References Cited

U.S. PATENT DOCUMENTS

| | | |
|---|---|---|
| 5,975,490 A | 11/1999 | Essman |
| 6,460,898 B1 | 10/2002 | Chieh |
| 7,811,278 B2 | 10/2010 | Knipple, Jr. |
| 2007/0241560 A1* | 10/2007 | Malone ................. F16L 37/565 285/123.3 |
| 2009/0272453 A1 | 11/2009 | Schlecht |
| 2013/0160201 A1* | 6/2013 | Okubo ..................... B05B 1/18 4/615 |

OTHER PUBLICATIONS

"Hose Fittings Products," Ontario Hose, Ontario Canada, <http://www.ontariohose.com/product_category/couplings>, at least as early as Mar. 2017, 11 pages.

"Irrigation Fittings," Spokane, Washington, 6-page brochure, at least as early as Oct. 2010, 6 pages.

Amendment After Non-Final dated Jan. 14, 2019, in response to the Non-Final Office Action dated Sep. 14, 2018, from U.S. Appl. No. 15/435,236, filed Feb. 16, 2017, 7 pages.

\* cited by examiner

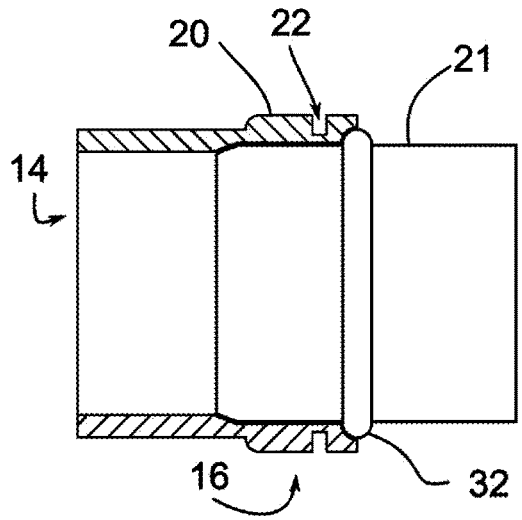
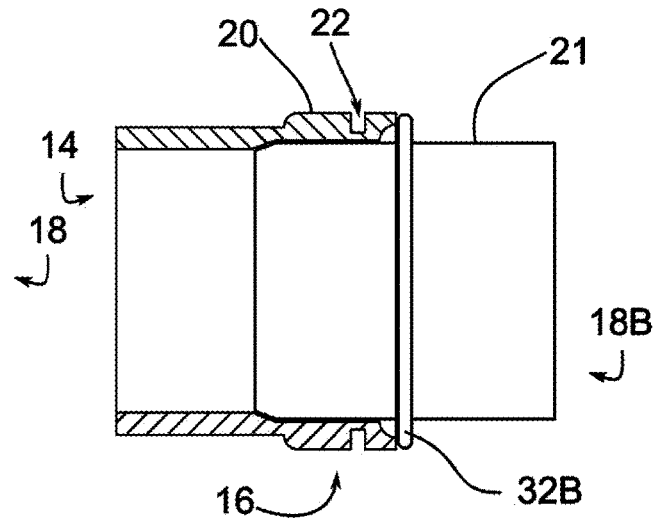
Fig. 4　　　　　Fig. 5
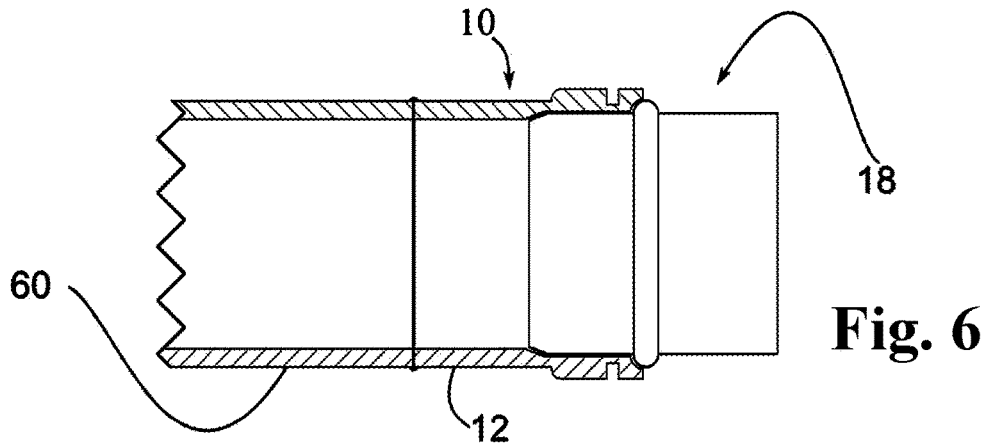
Fig. 6
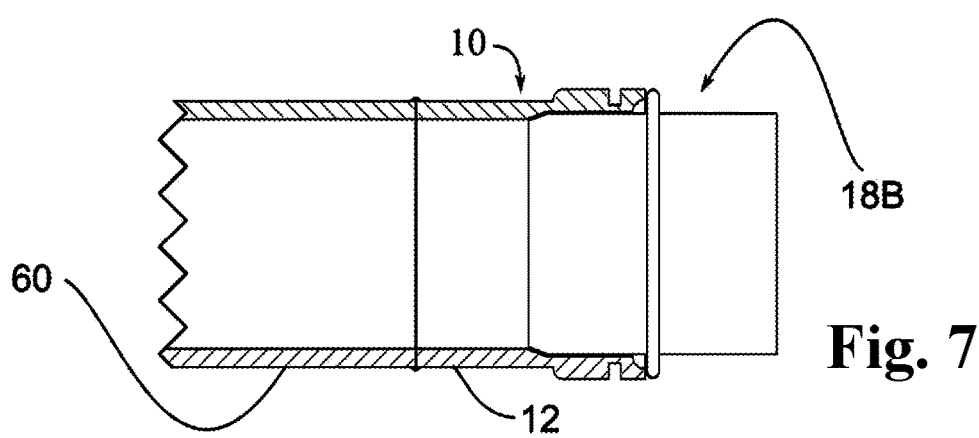
Fig. 7

DIG TUBES AND FITTINGS FOR TUBULARS

TECHNICAL FIELD

Dig tubes and fittings for tubulars, particularly for a vacuum system, for example hydrovac system, flusher truck, air vac or other vacuum systems.

BACKGROUND

Dig tubes are used in vacuum systems for example to assist in excavating holes in the ground, particularly where care must be taken to avoid damage to underground systems. For example in a hydrovac or flusher system, water is injected into the ground and the resulting slurry is vacuumed up using the dig tube. Dig tubes may be used for example to dig up pipelines without causing damage to the pipeline. Applicant proposes a new fitting for a dig tube.

SUMMARY

Disclosed are new male and female fittings for connecting tubing, particularly dig tube fittings for a vacuum system, and dig tubes incorporating the fittings.

In one embodiment, a female fitting is disclosed comprising a tube having an end that includes an upset for receiving a male fitting, the upset having an outer circumference and an inwardly extending groove extending around the outer circumference for receiving a clamp or portion of a clamp and the upset having an end face and inner surface, the upset having an undercut between the end face and inner surface for receiving a flange of the male fitting.

In another embodiment, a male fitting comprises a tube having an end part; and a transition between the tube and the end part, the transition comprising a flange extending radially outward from the tube and a radiused corner connecting the flange to the end part.

In another embodiment, a tubular structure is disclosed comprising a male fitting and female fitting connecting tube parts.

BRIEF DESCRIPTION OF THE FIGURES

Embodiments will now be described with reference to the figures, in which like reference characters denote like elements, by way of example, and in which:

FIG. 4 is a side view of an embodiment of a male travis fitting with a narrow flange assembled into the female dig tube fitting of FIG. 1, with the female dig tube fitting shown in cross-section and the travis fitting provided in plan view.

FIG. 5 is a side view of an embodiment of a male bandlock fitting with a narrow flange assembled into the female dig tube fitting of FIG. 1, with the female dig tube fitting shown in cross-section and the bandlock fitting provided in plan view.

FIG. 6 is a section through the female dig tube fitting of FIG. 6 with bandlock fitting inserted.

FIG. 7 is a section through the female dig tube fitting of FIG. 6 with travis fitting inserted.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Figure 1:
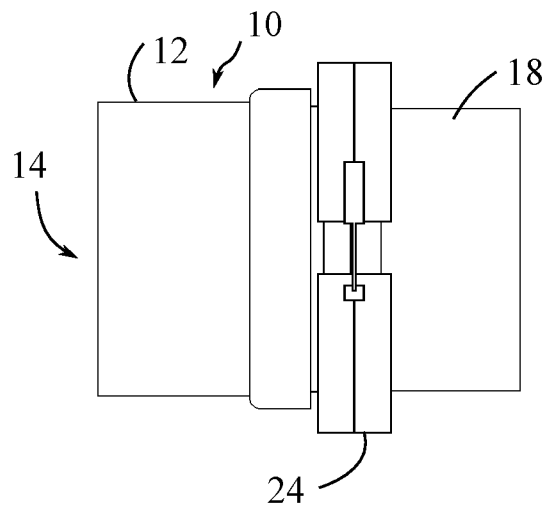
FIG. 1 is a side view of an embodiment of a female dig tube fitting attached to a male fitting and with a clamp around the female dig tube fitting.
Figure 2:
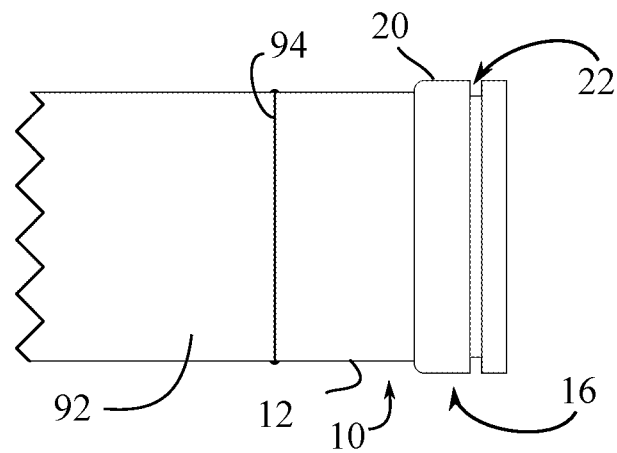
FIG. 2 is a side view of the female dig tube fitting of FIG. 1 without clamp or male fitting, showing a connection to a vacuum system part.

As shown in FIG. 1, a female dig tube fitting 10 for a vacuum system may be formed from a tube 12 made from high density polyethylene (HDPE) having a density in the range of 0.93 to 0.97 g/cm$^3$. The density may for example be 0.9490 g/cm$^3$. The tube 12 has an end 14. The end 14 may be welded or otherwise secured to a dig tube, not shown in FIG. 1, but see dig tube 60 in FIG. 6. The dig tube 60 may comprise multiple segments of connected tubing.

As shown in FIGS. 1-8, the female fitting 10 includes an upset 16 for receiving a male fitting such as a travis fitting 18B or bandlock fitting 18 of a vacuum tube of a vacuum system, for example a hydrovac vehicle.

The upset 16 has an outer circumference 20 and an inwardly extending groove 22 extending around the outer circumference 20 for receiving a clamp 24 (FIG. 1 for example). The clamp itself may be conventional. In another embodiment, the upset may have an annular ridge (not shown), in place of the inwardly extending groove 22, extending around the outer circumference 20 for receiving a clamp 24. In another embodiment, the upset may have both the inwardly extending groove 22 as well as an annular ridge (not shown) for receiving a clamp 24.

Figure 3:
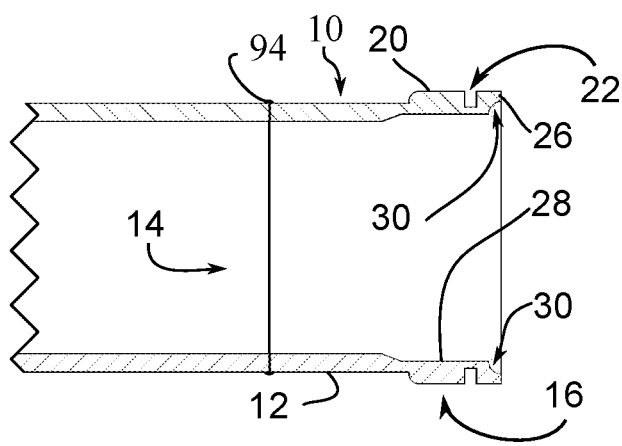
FIG. 3 is a cross-section of the embodiment of FIG. 2.

As shown in FIG. 3, the upset 16 has an end face 26 and inner surface 28, the upset 16 having an undercut 30 between the end face 26 and inner surface 28 for receiving a flange, rib or ridge 32 or 32B respectively of a male fitting such as a bandlock fitting 18 (FIG. 4) or travis fitting 18B (FIG. 5). The undercut 30 may be radiused and concave to receive a bandlock fitting or other fitting having a radiused ridge such as in a bandlock fitting 18. In another embodiment, upset 16 receives a wide-flanged travis fitting 18B with a wide flange, rib or ridge 32B resting against the end face 26. The flange 32 of the bandlock fitting 18 or the flange 32B of the travis fitting 18B may be formed or inserted at the end of the vacuum hose 42 of the vacuum system 40 (not shown in FIG. 3, but see FIG. 11).

The clamp 24 shown in FIG. 1 may be tightened around the outer circumference 20 by a hook and lever mechanism, as shown in FIG. 1. The clamp 24 may be different sizes and may be fitted in the groove 22, or it may fitted partially in the groove and partially out of the groove, or it may be fitted entirely outside the groove. In an embodiment where the groove 22 is supplemented or replaced with the annular ridge (not shown), the clamp 24 may be fitted over the annual ridge.

The bandlock fitting 18 (FIG. 4) or travis fitting 18B (FIG. 5) respectively of a vacuum tube 42 may have an outer circumference 21 with a diameter of for example 5.9-6.2 inches, and in one example may be 6.075 inches in diameter. The outer circumference 21 of the travis fitting or bandlock fitting of the vacuum tube may be tapered at the end of the fitting which is received in the upset 16, and this tapered end may be between 0.4 and 0.6 inches in length and in one example may be 0.501 inches in length. As shown in FIG. 4, the flange 32 may also be radiused with a matching radius to the undercut, so that the flange 32 when received in the undercut 30 provides a tightly fitting connection respectively between the flange 32 and the undercut 30.

The upset 16 may have a length of 2-3 inches or smaller or larger depending on the application, and in one example may have a length of 2.4 inches. The upset 16 may have a tapered interior portion corresponding to a taper of the travis fitting or bandlock, or the taper of the interior of the upset may simply form a shoulder, which may or may not form a stop for movement of the male fitting into the tube 12. The upset 16 has radiused concave undercut 30 between the end face 26 and inner surface 28.

Examples of the sizes of the fittings are disclosed in this paragraph. The exterior diameter of the upset 16 may be for example approximately 6.5-8 inches and in one example may be 7.265 inches. The inner diameter of the upset 16 may be for example approximately 6-7.5 inches and in one example may be 6.735 inches. The radius of the undercut 30 may for example be in the range of 0.2 to 0.45 inches, and may in one example be 0.330 inches. The upset 16 also has groove 22, which may have a groove depth of approximately 0.2-0.6 inches, and in one example may have a depth of 0.421 inches. The groove 16 may have a groove width of approximately 0.2-0.4 inches, and in one example may have a width of 0.3 inches. The dimensions given here for an exemplary embodiment will vary with the size of tubing.

The female fitting 10 may be attached to a dig tube 60 as shown in FIGS. 6 and 7, and coupled to a fitting such as a bandlock fitting 18 (FIG. 6) or travis fitting 18B (FIG. 7). The tube 60 may be made from high density polyethylene (HDPE). In the case of using HDPE, the fitting 10 may be butt welded to the tube 60. The female fitting 10 may be made of metal, but is preferably made from HDPE. The female fitting, male fitting, and tube parts connected to the male fitting and female fitting may all be made from HDPE or other hard plastic.

HDPE has a large strength-to-density ratio, due to its low amount of branching which gives it stronger intermolecular forces and tensile strength than low density polyethylene (LDPE). HDPE has a higher specific strength than LDPE because the difference in strength is greater than the difference in density. HPDE is a thermoplastic material composed of carbon and hydrogen atoms joined together forming high molecular weight products. To make HDPE, in an embodiment, methane gas is converted into ethylene, then, with the application of heat and pressure, into polyethylene. The polymer chain may be 500,000 to 1,000,000 carbon units long. Short and/or long side chain molecules exist with the polymer's long main chain molecules. The longer the main chain, the greater the number of atoms, and consequently, the greater the molecular weight. HDPE is also harder than LDPE and can withstand temperatures of 120 degree Celsius for short periods. The female fitting 10 may for example be made of HDPE of one or more of the following types: PE100, PE4710, PE3408, or PE3608, as designated by the Plastics Pipe Institute. PE4710 has a density cell class of 4.

The female fitting 10, tube 60 or male fitting 80 (described below) may be orange, black or any other colour. The tubes 12 and 78 (described below) may have a range of wall thicknesses, for example, a wall thickness between 0.310 and 0.507 inches. The tubes may have a range of outer and inner diameters, such as for example 8.624 inches outer diameter and 7.549 inner diameter (8 inch tube), or 6.625 outer diameter and 5.700 inner diameter (6 inch tube) or be made for other nominal diameters for example 4 inch.

Figure 8:
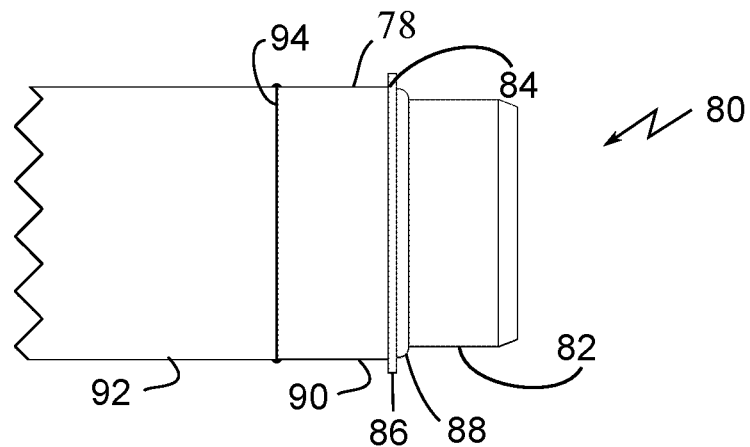
FIG. 8 is a side view of a male dig tube fitting welded to a portion of a vacuum systems, which may be a dig tube or vacuum tube.
Figure 9:
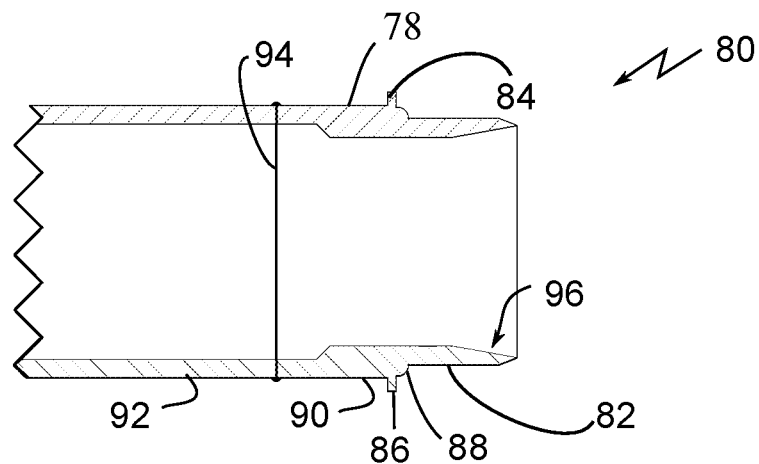
FIG. 9 is a section through the male dig tube fitting of FIG. 8.

Referring to FIGS. 8 and 9, there is shown a male fitting 80, particularly useful as a dig tube fitting for a vacuum system. A part 92 of the vacuum system is shown attached to the fitting 80 for example using a butt welded joint 94. The part 92 may be a dig tube, but also could be a vacuum tube. The fitting 80 is formed of a tube 78 having an end part 82 and a transition 84 between the tube outer diameter 90 and the end part 82. The transition 84 comprises a flange 86 extending radially outward from the tube 78 and a radiused corner 88 connecting the flange 86 to the end part 82. The end part 82 has an end outer diameter, and the end outer diameter is smaller than the tube outer diameter 90. The male dig tube fitting 80 may be made from high density polyethylene having a density in the range of 0.93 to 0.97 g/cm3, as with the female dig tube fitting. The male fitting 80 may have a conical inner surface 96 in the end part 82.

Figure 10:
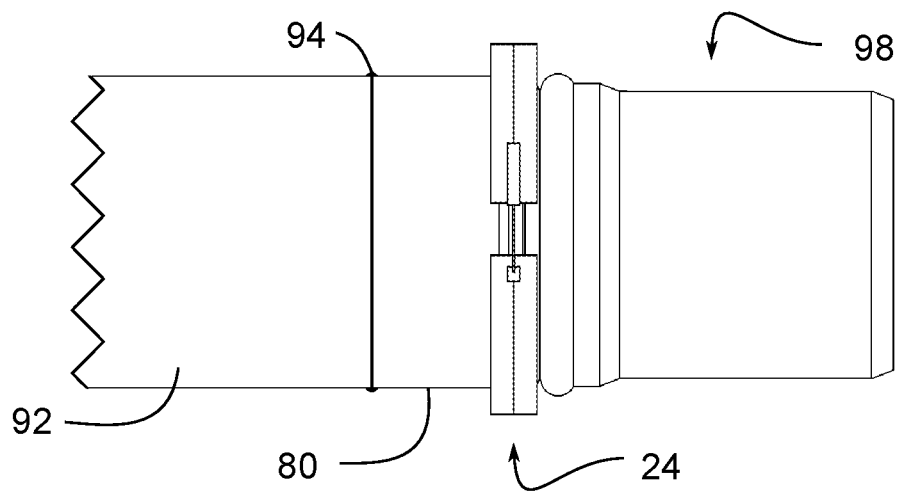
FIG. 10 is a side view of the male dig tube fitting of FIG. 8 with a female fitting attached.

As shown in FIG. 10, any of various female fittings 98 may be secured to a male fitting 80 and secured for example with clamp 24. The embodiments of FIGS. 3 and 9 may be connected together to form a tubular structure, used for example as a dig tube. The male fitting and female fitting disclosed may be used to connect various tube parts together, such as parts of a dig tube but also for example irrigation equipment, and other tubes or pipes that convey fluid.

Figure 11:
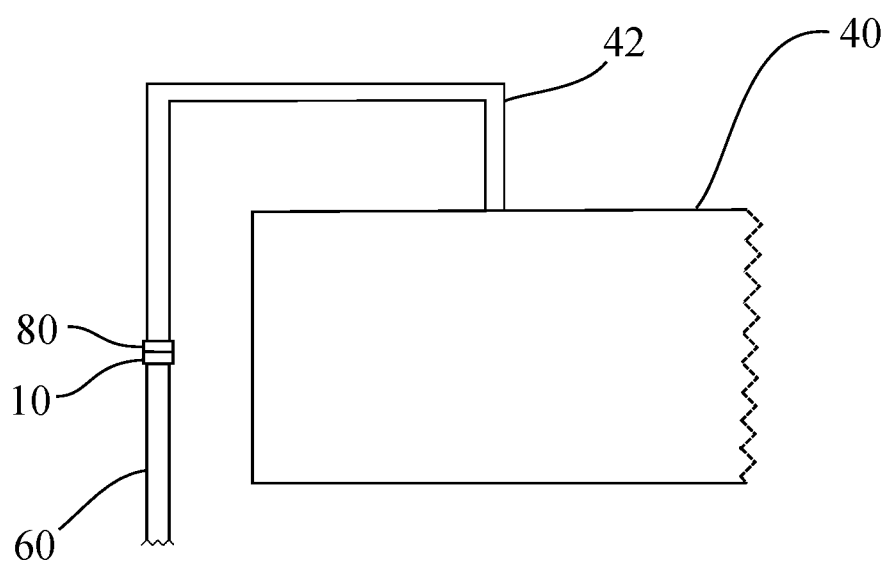
FIG. 11 is a side view of a dig tube fitting in use connecting a hydrovac system to a dig tube.

Referring to FIG. 11, there is shown an arrangement of the male and female fittings, 80 and 10 respectively, in use in a hydrovac system. Vacuum tube 42 connects vacuum system 40 to male fitting 80. The male fitting may be secured to female fitting 10 which is attached to dig tube 60.

The embodiments of the invention in which an exclusive property or privilege is claimed are defined as follows:

1. A hydrovac vehicle or a flusher truck, comprising:
a vacuum system mounted on the hydrovac vehicle or flusher truck; and
a vacuum tube in fluid connection with the vacuum system;
the vacuum tube further comprising a tube part comprising:
a female fitting comprising an end that includes an upset for receiving a male fitting, the upset having an outer circumference and an inwardly extending groove extending around the outer circumference for receiving a clamp or portion of a clamp and the upset having an end face and inner surface, the upset having an undercut between the end face and inner surface for receiving a flange of the male fitting, and
the tube part being made from high density polyethylene having a density in the range of 0.93 to 0.97 g/cm$^3$.

2. The hydrovac vehicle or flusher truck of claim 1 in which the undercut is radiused and concave.

3. The hydrovac vehicle or flusher truck of claim 1 in which the tube part is attached to a dig tube.

4. The hydrovac vehicle or flusher truck of claim 3 in which the dig tube is made from high density polyethylene having a density in the range of 0.93 to 0.97 g/cm$^3$.

5. A hydrovac vehicle or a flusher truck, comprising:
a vacuum system mounted on the hydrovac vehicle or flusher truck; and a vacuum tube in fluid connection with the vacuum system;

the vacuum tube further comprising a tube part comprising:

a male fitting comprising:

a fitting tube having an end part; and a transition between the fitting tube and the end part, the transition comprising a flange extending radially outward from the fitting tube and a radiused corner connecting the flange to the end part, and the tube part being made from high density polyethylene having a density in the range of 0.93 to 0.97 g/cm³.

6. The hydrovac vehicle or flusher truck of claim 5 in which the fitting tube has a tube outer diameter and the end part has an end outer diameter, and the end outer diameter is smaller than the tube outer diameter.

7. The hydrovac vehicle or flusher truck of claim 5 in which the tube part is attached to a dig tube.

8. The hydrovac vehicle or flusher truck of claim 7 in which the dig tube is made from high density polyethylene having a density in the range of 0.93 to 0.97 g/cm³.

9. A hydrovac vehicle or a flusher truck, comprising:

a vacuum system mounted on the hydrovac vehicle or flusher truck;

a vacuum tube in fluid connection with the vacuum system; and the vacuum tube further comprising:

a first tube part having a male fitting, a second tube part having a female fitting, a clamp securing the female fitting to the male fitting, and in which one or both of the first tube part and the second tube part are made from high density polyethylene having a density in the range of 0.93 to 0.97 g/cm³.

10. The hydrovac vehicle or flusher truck of claim 9 in which both the first tube part and the second tube part are made from high density polyethylene having a density in the range of 0.93 to 0.97 g/cm³.

11. The hydrovac vehicle or flusher truck of claim 9 in which the first tube part is made of high density polyethylene having density 0.9490 g/cc.

12. The hydrovac vehicle or flusher truck of claim 9 in which the second tube part is made of high density polyethylene having density 0.9490 g/cc.

13. The hydrovac vehicle or flusher truck of claim 9 in which the second tube part has an end with an upset for receiving the male fitting.

14. The hydrovac vehicle or flusher truck of claim 13 in which the upset has a groove.

15. The hydrovac vehicle or flusher truck of claim 9 in which the first tube part has an end part and a transition between the first tube part and the end part.

16. The hydrovac vehicle or flusher truck of claim 15 in which the transition further comprises a flange extending radially outward from the second tube.

* * * * *